Dec. 5, 1967  F. H. MAGNUS  3,356,439
SUN GLASSES HAVING THREE PAIRS OF DIFFERENT COLOR TINTED LENSES
Filed Aug. 20, 1963  3 Sheets-Sheet 1
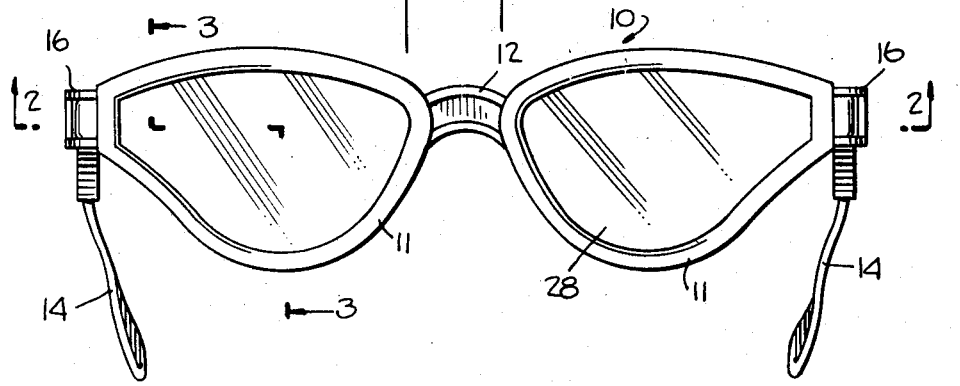
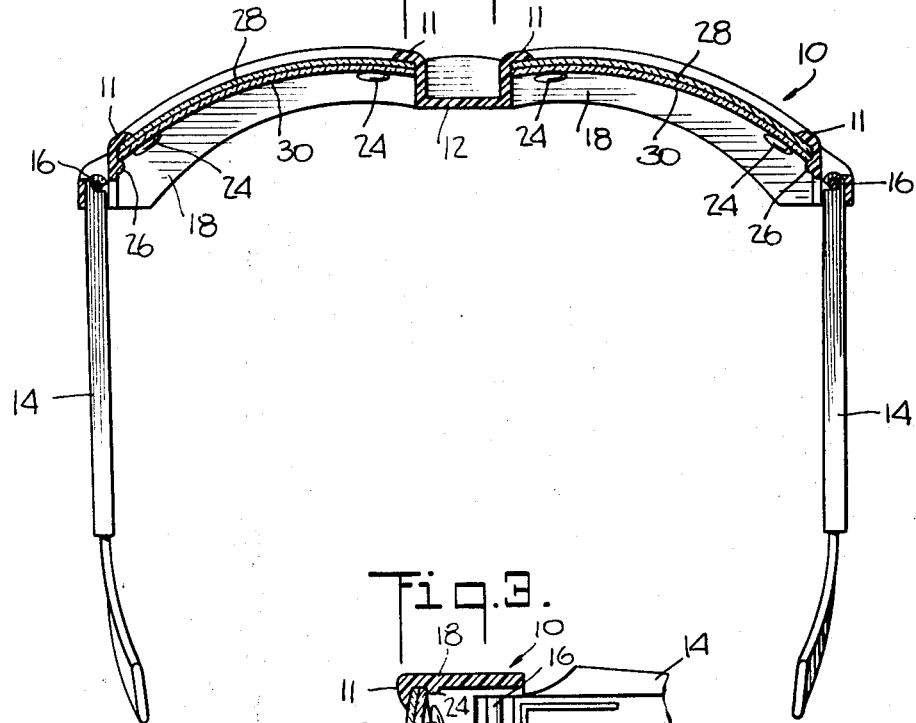
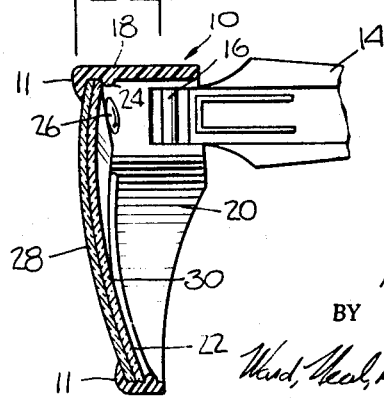
INVENTOR.
FINN H. MAGNUS
BY
ATTORNEYS Dec. 5, 1967 F. H. MAGNUS 3,356,439
SUN GLASSES HAVING THREE PAIRS OF DIFFERENT COLOR TINTED LENSES
Filed Aug. 20, 1963 3 Sheets-Sheet 2
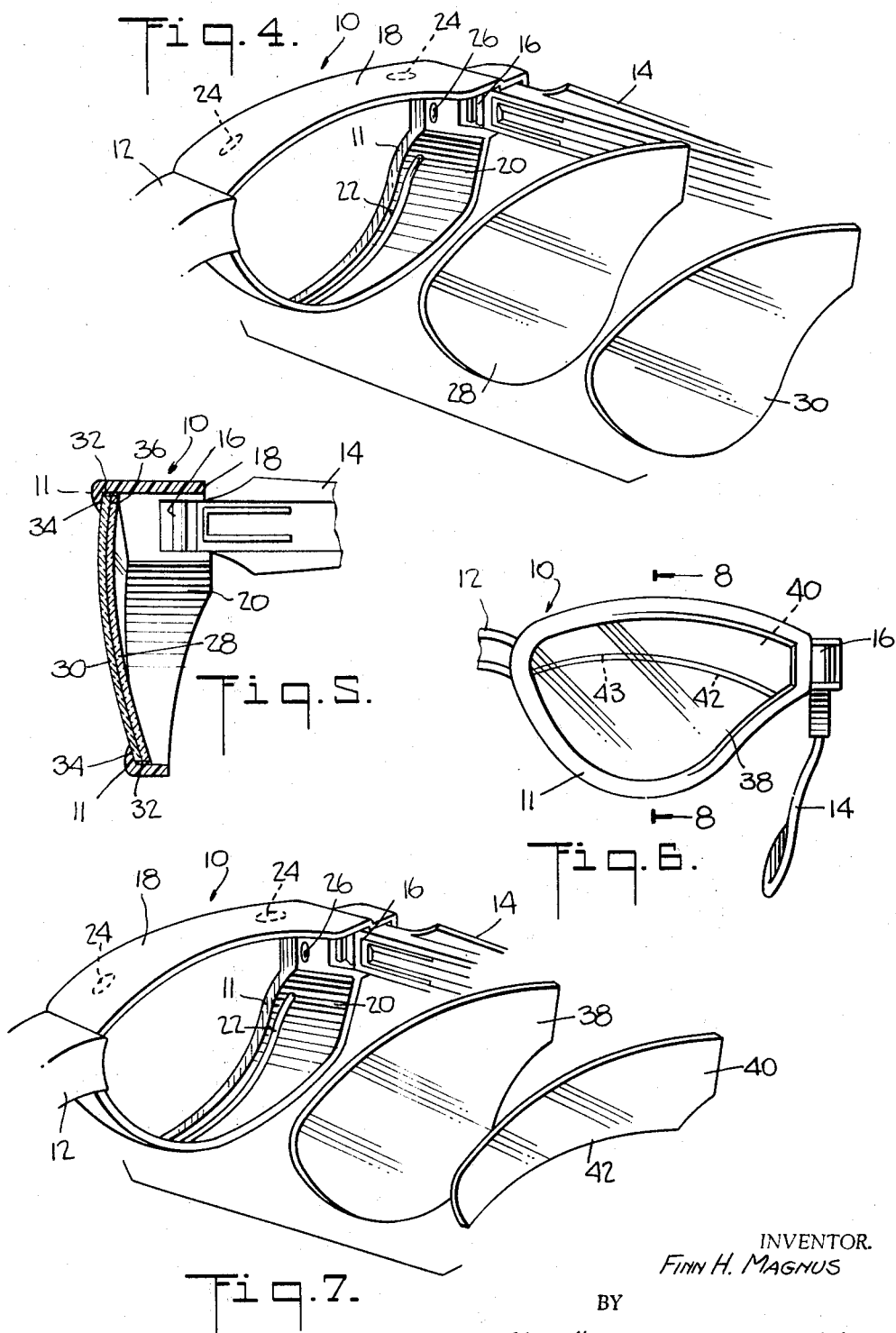
INVENTOR.
FINN H. MAGNUS
BY
ATTORNEYS Dec. 5, 1967  F. H. MAGNUS  3,356,439
SUN GLASSES HAVING THREE PAIRS OF DIFFERENT COLOR TINTED LENSES
Filed Aug. 20, 1963  3 Sheets-Sheet 3
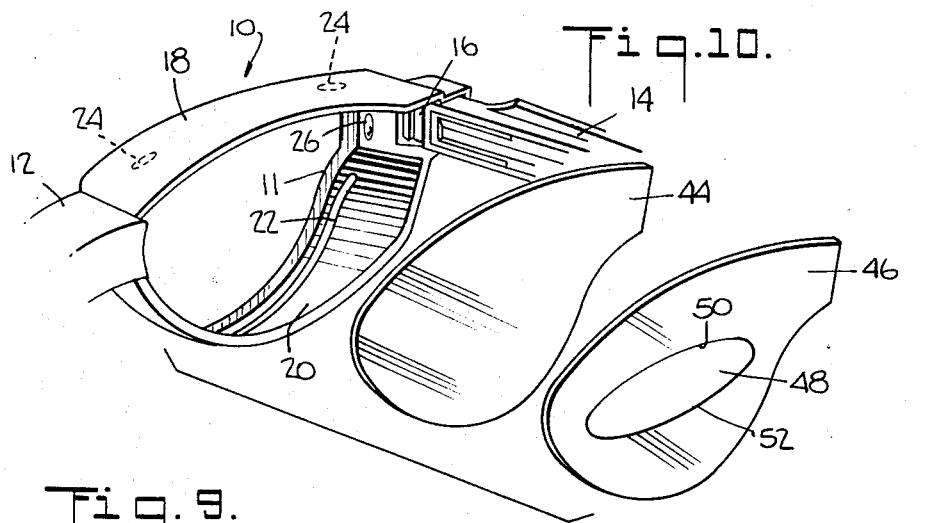
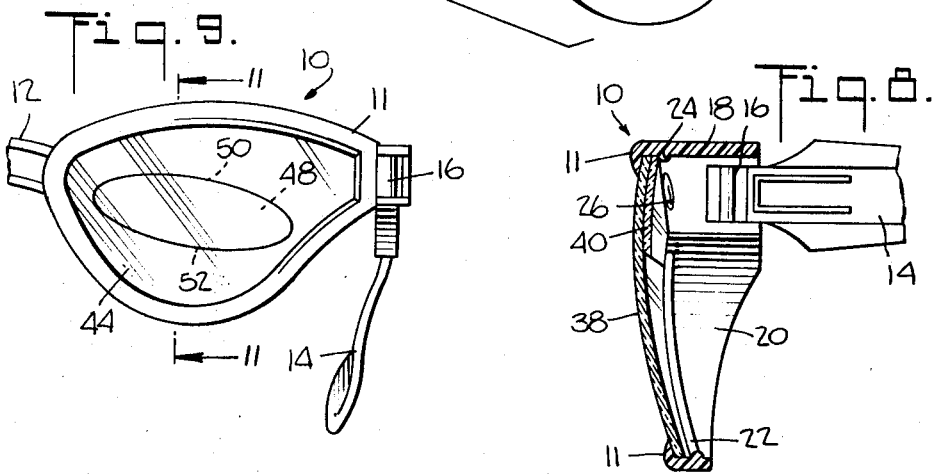
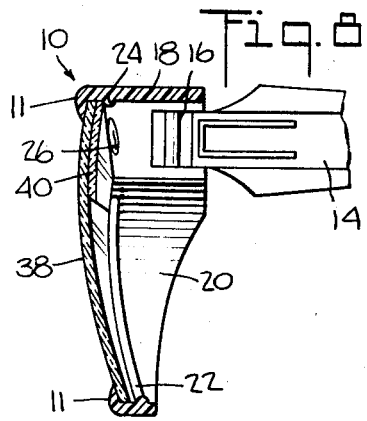
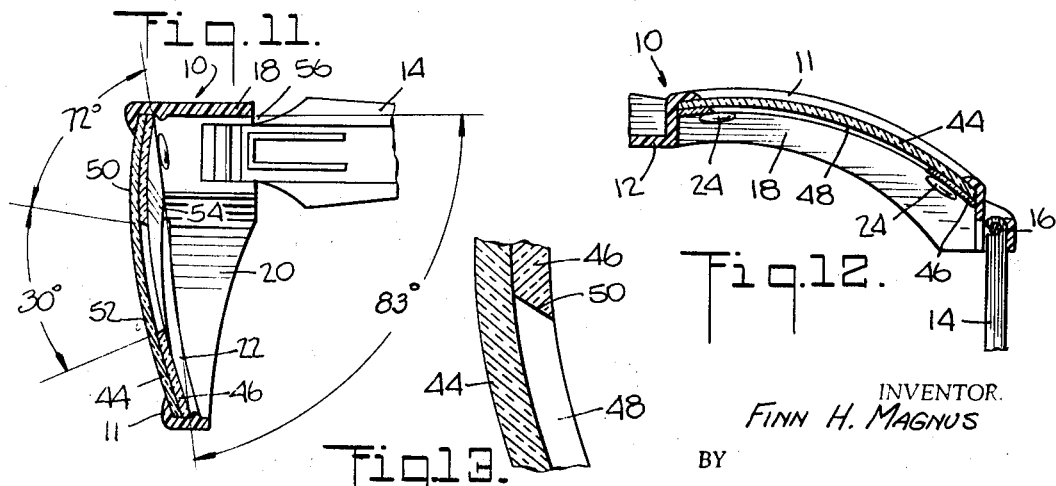
INVENTOR.
FINN H. MAGNUS
BY
ATTORNEY

United States Patent Office 3,356,439
Patented Dec. 5, 1967

3,356,439
SUN GLASSES HAVING THREE PAIRS OF DIFFERENT COLOR TINTED LENSES
Finn H. Magnus, Washington Valley Road, Morristown, N.J. 07960
Filed Aug. 20, 1963, Ser. No. 303,237
1 Claim. (Cl. 351—47)

This application is a continuation-in-part of my copending application Serial No. 210,901, filed July 18, 1962, now Patent No. 3,261,652.

This invention relates to spectacles and more particularly to sun glasses and lenses therefor.

Sun glasses embodying the invention are particularly adapted, among other possible uses, for reading in the direct sunlight, viewing television, night driving, outdoor activities in a snow environment, and many other conditions where sun glasses are normally employed. Further, such glasses protect the eyes from irritation or damage due to wind or particles of foreign matter. Heretofore, sun glasses were constructed with a single lens of one color which tended to develop eye strain, watery eyes, slight headaches and other discomforts. Attempts have been made to overcome these problems by the use of a single amber lens. While it is well known that such lenses are effective for filtering ultraviolet rays from the sunlight, these lenses have not been popularly accepted due to the fact that they do not present a pleasing atmosphere to the wearer and, hence, they are psychologically deficient. Further, attempts have been made to spray the lens in order to obtain varying degrees of shading thereacross, but this solution to the aforementioned problems has also not been effective due to the high cost involved and the fact that the spray wears off or "washes off" in a relatively short period of time.

In essence, the present invention contemplates the provision of sun glasses comprising a frame, a plurality of pairs of lenses mounted on said frame, each of which are disposed in juxtaposed relation with respect to the next adjacent lens. Each pair of lenses may be provided with a different color tint or shading, and one or more pair of lenses may also be provided with a horizontal slit located directly in line with the wearer's forward horizontal vision. Moreover, a portion of the lens may be removed to produce reduced shading in certain areas, as desired.

Quite unexpectedly and surprisingly to those skilled in the art of manufacturing sun glasses I have found that spectacle construction in accordance with the concepts of my invention affords better shading, less eye strain, better filtering and less glare.

A feature of my invention resides in the provision of improved sun glasses, with which a plurality of pairs of lenses are employed, with which two or more lenses may be permanently adhered to each other, with which the wearer may employ one, two or three lenses selected for particular occasions or atmospheric conditions, with which the lenses may be readily removed from the frame as desired, with which lenses may be employed having pleasing and restful color tints or shades, with which varying degrees of shading may be provided across the lenses, and with which less sun ray penetration occurs due to the fact that when a plurality of different colored lenses are employed each color repels or arrests different sun rays.

Another feature of my invention resides in the provision of improved lenses which are provided with central light "slits" and darker areas around the edges thereof, and which overcome the problem of "picture framing" of the lens.

Still another feature of my invention is to provide improved sun glasses which are simple of construction, which are readily adaptable to suit individual personal requirements, and which are compact, convenient, practical and inexpensive to manufacture.

There has thus been outlined rather broadly the more important features of my invention in order that the detailed description thereof that follows may be better understood, and in order that the present contribution to the art may be better appreciated. There are, of course, additional features of the invention that will be described hereinafter and which will form the subject of the claim appended hereto. Those skilled in the art will appreciate that the conception on which this disclosure is based may readily be utilized as a basis for the designing of other structures for carrying out the several purposes of the invention. It is important, therefore, that the claim be regarded as including such equivalent constructions as do not depart from the spirit and scope of the invention. Specific embodiments of the invention have been chosen for purposes of illustration and dscription, and are shown in the accompanying drawings, forming a part of the specification, wherein:

FIG. 1 is a front elevation showing a pair of sun glasses in accordance with the concept of my invention;

FIG. 2 is a horizontal section taken along line 2—2 of FIG. 1;

FIG. 3 is an enlarged vertical section taken along line 3—3 of FIG. 1;

FIG. 4 is an enlarged exploded perspective view showing two lenses and a portion of the frame;

FIG. 5 is an enlarged sectional view similar to FIG. 3 showing another embodiment of my invention;

FIG. 6 is a front elevation showing a portion of a pair of glasses in accordance with another embodiment of my invention;

FIG. 7 is an exploded perspective view showing two lenses and a portion of the frame of the embodiment of FIG. 6;

FIG. 8 is a sectional view taken along the line 8—8 of FIG. 6;

FIG. 9 is a front elevation showing a portion of a pair of glasses in accordance with still another embodiment of my invention;

FIG. 10 is an exploded perspective view showing two lenses and a portion of the frame of the embodiment of the invention in accordance with FIG. 9;

FIG. 11 is a vertical sectional view taken along line 11—11 of FIG. 9 and showing means for fastening the lenses to the frame;

FIG. 12 is a fragmentary horizontal sectional view showing means for fastening the lenses to the frame;

FIG. 13 is an enlarged view of the slit in one of the lenses in the embodiment of FIGS. 9, 10 and 11.

In the embodiment of the invention illustrated in FIGS. 1 to 4, the sun glasses include a frame 10, a bridge structure 12 and a pair of temples 14 hingedly connected to the frame 10 as at 16 (FIG. 1). As best seen in FIG. 4 the frame 10 is provided with an upper shield portion 18 and a lower shield portion 20 which provide protection from glare or rays of light passing inwardly towards the eye. For purposes of removably fastening the lenses to the frame 10, the frame is provided with a substantially vertically disposed flange-like projection 11 extending substantially around the entire marginal edge as best seen in FIG. 1. Frame 10 is further provided with a lower elongated ridge 22 (FIG. 4), a pair of spaced upper lugs 24 and an end lug 26 (FIGS. 2 and 4). Hence, lenses 28 and 30 are snapped into position having the outer face thereof engaging projection 11 and the inner face (towards the wearer) engaging the ridge 22 and lugs 24 and 26.

In accordance with the concept of my invention a plurality of lenses are provided each being of a different color so that some sun rays are filtered out as the light passes through one of the lens and other sun rays are filtered out as the light passes through the second lens. Moreover, lenses of a color which are unpleasant to the wearer when employed individually may be employed in combination with other color lenses to develop a pleasing combination for the wearer. For example, amber colored lenses are found to be a very good arresting agent for ultraviolet sun rays but they tend to psychologically depress the wearer. Such a lens could readily be used in combination with other colors such as green or blue for example to produce a pleasing effect. In the embodiment as illustrated in FIGS. 1–4, a plurality of lenses, 28 and 30, are snapped into position as described heretofore. It will be appreciated that the wearer may purchase several extra pair of lenses and place the desired combination of lenses into the frame to suit the particular occasion. For example, colors may be selected to match the other attire of the wearer or colors may be selected to suit the particular weather conditions of the day.

It has been found desirable to employ a total lens thickness of the order of about .090 inch to .100 inch. Hence, when three lenses are employed in series each lens would preferably have a thickness of the order of about .030 inch, or when two lenses are employed, as illustrated in FIG. 4 each lens would have a thickness of the order of about .050 inch.

Referring to FIG. 5 another method of fastening the lenses 28 and 30 to the frame 10 is illustrated. In this embodiment adhesive is applied along the edges of each of the lenses as at 32. Additional adhesive may be applied to the flange surface as at 34. If desired, adhesive may also be applied between the individual lenses towards the marginal edges as at 36. Sun glasses constructed in accordance with this embodiment have the advantage that the lenses will always remain in place and the possibility of loss thereof is remote.

In the embodiment of the invention illustrated in FIGS. 6, 7 and 8, the sun glasses include a frame member 10 which is identical to the frame member of the embodiment illustrated in FIGS. 1–4. In this embodiment a plurality of lenses are employed each of a different color, two lenses being shown. One of the lenses 40 (FIG. 7) is actually a partial lens having an arcuate lower marginal edge 42 located at least above the wearer's horizontal vision line, said edge being provided with a bevel as indicated at 43, FIG. 6. In this manner additional shading is provided above the line of the wearer's forward horizontal vision. Hence, additional shading is provided at the location where it is most needed without obstructing the wearer's vision and thereby providing less eye strain.

It should be understood that lenses 38 and 40 may be attached to the frame 10 in either the manner described in connection with FIGS. 1–4 or the manner described in connection with FIG. 5.

In the embodiment of the invention illustrated in FIGS. 9 to 13, the sun glasses include a frame member 10 which is identical with the frame of the sun glasses of FIGS. 1–4 and FIGS. 6–8. In this embodiment a plurality of lenses 44 and 46 are carried by frame 10. Lens 44 is similar to lenses 28 and 30 previously described and may be of any desired tint or shade. Lens 46 is provided with an elongated horizontally disposed elliptical slot or slit 48 which is substantially centrally located as shown in FIG. 10. This slot extends horizontally across the greater portion of the lens and has a width which is relatively small as compared to the length. I prefer an elliptical shape slit having a major axis of the order of about 1½ inches and a minor axis of the order of about 7/16 inch. Such slit 48 is positioned so that the direct, forward, horizontal line of vision of the wearer is directed therethrough. Since the lens 46 itself is of color tint or shading and the slit is opened to pass light therethrough, I have found that the general contour of the slit as illustrated in FIG. 10 provides suitable direct vision while still eliminating glare.

The lenses 44 and 46 may be removably secured to the frame 10 by means of the ridge 22, lugs 24, 26 and the flange-like projection 11 in the same manner as described in connection with FIGS. 1–4 or the lenses may be permanently adhered to the frame in the same manner as described in connection with FIG. 5.

Slit 48 in lens 46 is defined by an internal beveled edge having an upper portion 50 and a lower portion 52 as best seen in FIG. 10. FIG. 11 is a vertical transverse section taken through the center of the lens by bisecting the major axis of the slit at substantially its mid-point. The bevel is defined as the included angle formed in the section of FIG. 11 between the upper and lower portions and is preferably of the order of about 30 degrees. In the section of the lens as shown in FIG. 11, the bevel is also defined by a line 54 connecting the end points of the concave surface of the lens 46 and the upper portion 50 of the beveled edge, said angle preferably being of the order of about 72 degrees. The purpose of the aforementioned beveled edge defining the slit 48 is to eliminate "picture framing" or what is known as the "spectrum" or rainbow colors. Ordinarily, when the sunlight strikes the edge of a mirror, a glass prism, or lens, the white light is broken up into different wave lengths so that different colors are observed. By means of beveling the edge of the slit 48 this spectrum is eliminated. Preferably this beveled angle is obtained by means of grinding.

Still referring to FIG. 11, line 56 is a horizontal line substantially parallel to the wearer's forward horizontal vision line. The lenses are inclined downwardly and inwardly with respect to line 56 forming an angle of the order of about 83 degrees between line 54 and line 56. This provides styling as well as added comfort and better visibility for the wearer.

The frame member 10 is adapted to be molded from tinted opaque resilient plastic material or the like. This material is sufficiently rigid so that it provides adequate structural strength and also it is adaptable for tinting by various ornamental and pleasing coloring medium. The lenses likewise may be manufactured from a semiopaque resilient plastic material and as described heretofore may be tinted with aesthetically pleasing colors as well as particular colors chosen for purposes of filtering certain light rays from passing therethrough. Further, one or more of the lenses may be magnified or formed in accordance with a particular prescription, if desired. The lenses illustrated are each concave-convex lenses having an inner concave surface and an outer convex surface so that when they are positioned in the frame 10 they are disposed in juxtaposed relation with respect to the next adjacent lens, respectively, whereby the convex portion of one lens engages the concave portion of the next adjacent lens, respectively, in a nest-like manner.

Although particular embodiments of the invention are herein disclosed for purposes of explanation, further modifications thereof after study of this specification, will be apparent to those skilled in the art to which the invention pertains. Reference should accordingly be had to the appended claim in determining the scope of the invention.

What is claimed and desired to be secured by Letters Patent is:

A pair of adjustable filtering sun glasses for use under varying conditions of sun exposure comprising a tinted opaque resilient plastic frame, a substantially vertically disposed flange-like projection extending substantially around a marginal edge of said frame, a plurality of spaced lugs projecting from said frame, a first pair of concave-convex lenses having a thickness of about .030 inch, a second pair of concave-convex lenses having a thickness of about .030 inch, and a third pair of concave-convex lenses having a thickness of about .030 inch, each of said lenses having a different color tint, said lenses being disposed in juxtaposed relation with respect to the next adjacent pair respectively, said lenses being adapted to be snapped into position having one face thereof engaging said flange-like projection and the other face thereof engaging said lugs, and said lenses when in their operative position being inclined with respect to the horizontal, said inclination being defined as the angle formed in a substantially central transverse section between a line connecting the end points of the concave surfaces with respect to the horizontal, said angle being about 83°, at least one of said pairs being provided with a pair of merging arcuate internal edges defining a horizontal slit, said edges being beveled at an acute angle of about 30° one with respect to the other, said bevel being further defined as an angle formed in a substantially central transverse section between a line connecting the end points of the concave surfaces and the upper portion of said edge, said angle being about 72°, said slit being elliptical shaped and having a minor axis length approximately ⅓ of the major axis length.

References Cited

UNITED STATES PATENTS

| | | | |
|---|---|---|---|
| 1,022,789 | 4/1912 | Kight | 88—54 |
| 1,222,049 | 4/1917 | Tillyer. | |
| 1,247,853 | 11/1917 | McWenie. | |
| 1,520,977 | 12/1924 | Stevens | 88—47 |
| 1,706,429 | 3/1929 | Willard | 88—41 |
| 1,721,194 | 7/1929 | Tillyer. | |
| 1,771,451 | 7/1930 | Suzuki et al. | 88—41 X |
| 2,012,620 | 8/1935 | Bean et al. | 88—41 |
| 2,076,432 | 4/1937 | Kinney | 88—54 |
| 2,230,009 | 1/1941 | Ordorica | 88—41 |
| 2,345,777 | 4/1944 | Somers | 88—112 X |
| 2,370,697 | 3/1945 | Tillyer | 88—54 X |
| 2,409,140 | 10/1946 | Malcom | 88—47 X |
| 2,422,534 | 6/1947 | DuBois. | |
| 2,423,539 | 7/1947 | Williams | 88—41 |
| 2,521,632 | 9/1950 | Hansen | 88—47 |
| 2,574,839 | 11/1951 | Pelzer | 88—47 |
| 3,060,804 | 10/1962 | Rogers | 88—53 |
| 3,066,573 | 12/1962 | Moeller | 88—41 |
| 3,254,932 | 6/1966 | Blaney | 351—47 |

FOREIGN PATENTS 245,336    1/1926    Great Britain.

DAVID H. RUBIN, *Primary Examiner.*

J. H. PEDERSEN, JOHN K. CORBIN, *Examiners.*